(12) United States Patent
Kieslinger et al.

(10) Patent No.: US 10,101,000 B2
(45) Date of Patent: Oct. 16, 2018

(54) LAMP UNIT COMPRISING A SHIELD HAVING AT LEAST ONE LIGHT WINDOW

(71) Applicant: ZIZALA LICHTSYSTEME GMBH, Wieselburg (AT)

(72) Inventors: Dietmar Kieslinger, Theresienfeld (AT); Johann Altmann, Gmünd (AT)

(73) Assignee: ZKW Group GmbH, Wieselburg an Der (AT)

( * ) Notice: Subject to any disclaimer, the term of this patent is extended or adjusted under 35 U.S.C. 154(b) by 353 days.

(21) Appl. No.: 14/776,950

(22) PCT Filed: Apr. 7, 2014

(86) PCT No.: PCT/AT2014/050081
§ 371 (c)(1),
(2) Date: Sep. 15, 2015

(87) PCT Pub. No.: WO2014/165884
PCT Pub. Date: Oct. 16, 2014

(65) Prior Publication Data
US 2016/0025292 A1    Jan. 28, 2016

(30) Foreign Application Priority Data

Apr. 9, 2013    (AT) .................................. 50242/2013

(51) Int. Cl.
*F21S 41/36*        (2018.01)
*F21S 8/10*         (2006.01)
(Continued)

(52) U.S. Cl.
CPC .............. *F21S 48/145* (2013.01); *B60Q 1/04* (2013.01); *F21S 41/147* (2018.01); *F21S 41/25* (2018.01);
(Continued)

(58) Field of Classification Search
CPC .. F21S 48/145; F21S 48/1159; F21S 48/1747; F21S 48/125; F21S 48/1388;
(Continued)

(56) References Cited

U.S. PATENT DOCUMENTS

| 1,725,117 | A | * | 8/1929 | Walthers | F21S 41/683 |
| | | | | | 362/325 |
| 2007/0086202 | A1 | * | 4/2007 | Tsukamoto | F21S 41/147 |
| | | | | | 362/514 |
| 2008/0239745 | A1 | * | 10/2008 | Naganawa | F21S 41/147 |
| | | | | | 362/516 |

* cited by examiner

*Primary Examiner* — Anh Mai
*Assistant Examiner* — Nathaniel Lee
(74) *Attorney, Agent, or Firm* — Eversheds Sutherland (US) LLP

(57) ABSTRACT

A lighting unit for a headlight, in particular a motor vehicle headlight, having at least two light sources (1a, 1b), at least one reflector (2a, 2b), which delimits two light chambers (3a, 3b), a bezel (4), and a projection lens (5) having an optical axis (A), wherein a light chamber (3a) is arranged on an upper side and a light chamber (3b) is arranged on an underside of the bezel (4), wherein at least one light source (1a, 1b) is arranged within each of the light chambers (3a, 3b) and the bezel (4) extends substantially as far as a focal plane (E) of the projection lens (5) in order to produce a sharp light/dark boundary in a light exposure produced by the lighting unit, wherein the bezel (4) has at least one light window (7a, 7b), wherein at least one light path (8a, 8b, 8c, 8d) extends outwardly from a light chamber (3a, 3b), through the at least one light window (7a, 7b) and through the projection lens (5).

7 Claims, 3 Drawing Sheets

Figure 1:
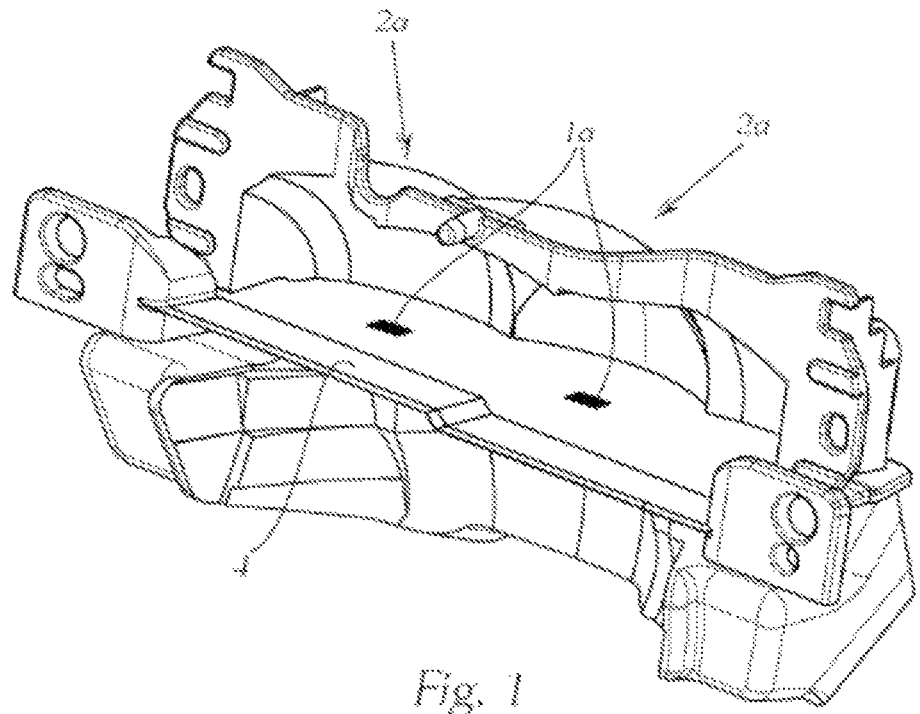

(51) Int. Cl.
  *B60Q 1/04* (2006.01)
  *F21S 41/147* (2018.01)
  *F21S 41/25* (2018.01)
  *F21S 41/43* (2018.01)
  *F21S 41/663* (2018.01)
  *F21S 41/365* (2018.01)

(52) U.S. Cl.
  CPC ............... *F21S 41/36* (2018.01); *F21S 41/43* (2018.01); *F21S 41/663* (2018.01); *F21S 41/365* (2018.01)

(58) Field of Classification Search
  CPC .. F21S 41/23; F21S 41/36; F21S 41/42; F21S 41/147; F21S 41/663; B60Q 1/04
  See application file for complete search history.

LAMP UNIT COMPRISING A SHIELD HAVING AT LEAST ONE LIGHT WINDOW

The invention relates to a lighting unit for a headlight, in particular a motor vehicle headlight, having at least two light sources, at least one reflector, which delimits at least two light chambers, a bezel, and a projection lens having an optical axis, wherein a light chamber is arranged on an upper side and a light chamber is arranged on an underside of the bezel, wherein at least one light source is arranged within each of the light chambers and the bezel extends substantially as far as a focal plane of the projection lens in order to produce a sharp light/dark boundary in a light projection produced by the lighting unit, wherein the bezel has at least one light window, wherein at least one light path from a light chamber extends outwardly through the at least one light window and through the projection lens.

Lighting units of this type are conventional in automotive engineering, wherein the light chamber located on the upper side (also referred to as the "upper light chamber") often performs a dipped beam function and the light chamber located on the underside (often also referred to as the "lower light chamber") provides a main beam function. The two light chambers are separated here from one another by a bezel that for example is designed to ensure a sharp light/dark boundary in a light exposure produced by the dipped beam function, such that a dazzling of vehicles driving in front and also of oncoming vehicles is largely avoided.

By way of example, document EP 1 912 018 A1 thus presents a lighting unit, in which two reflectors each form a light chamber, a light source irradiating into each light chamber, wherein the irradiated light is directed onto a projection lens by the reflector.

Furthermore, document DE 10 2008 015 510 B4 presents a lighting unit in which a reflector reflects light from a light source such that light is collected at an optical axis of a projection lens or in the vicinity thereof.

Document US 2007/0086202 A1 presents a lighting unit having two light sources that are arranged in two light chambers that are separate from one another. Furthermore, document JP 2006107875 A presents a lighting unit having two light sources arranged in light chambers that are separate from one another.

Document DE 60 2004 002 043 T2 discloses a lighting unit in which there are provided two ellipsoid reflectors, which each enclose a reflection chamber for light beams and each have a substantially elliptical reflection surface, two light sources, which are each arranged in the vicinity of a first focal point of each reflector, and a projection lens, of which the focal plane is arranged in the vicinity of a second focal point of the first reflector, wherein the first reflector also has a flat horizontal reflection surface, of which the upper side is reflective. The second reflector is arranged below the first reflector, wherein the second reflector is inclined relative to the first reflector and is designed to also direct light to the second focal point or in the vicinity thereof, wherein the flat horizontal reflection surface of the first reflector is mounted on the upper side of a light-permeable part, wherein the underside of the light-permeable part can be penetrated by light beams of the second reflector, such that the light beams can reach the second focal point. The objective of this lighting unit is to make use of the property that encapsulated diodes serving as a light source generally irradiate into one space half, whereby the light flux emitted by the diodes can be detected more efficiently to a large extent.

A disadvantage common to the lighting units known from the prior art is that they do not enable a selective mixing or overlapping of the light beams of a first light chamber mounted on the upper side and of a second light chamber mounted on the underside. In constructions known from the prior art a selective influencing of the light/dark boundary is therefore subject to narrow limits in view of conventional manufacturing and economical requirements.

The object of the invention is therefore to create a lighting unit for a headlight, in particular a motor vehicle headlight, which enables a selective mixing of the light beams of a first light chamber mounted on the upper side and of a second light chamber mounted on the underside. Here, a mixing of the light beams is understood to mean an overlapping of the illuminated region in the light projection.

This object is achieved with a lighting unit of the type mentioned in the introduction, in which, in accordance with the invention, the bezel has at least two bezel portions delimiting the at least one light window, wherein at least one bezel portion has a reflective surface, by means of which the at least one light path can be deflected in the direction of the optical axis of the projection lens. The provision of the characterising features according to the invention allows a selective influencing of the light projection and increases the efficiency of the lighting unit. Thanks to the invention, it is possible to selectively mix light beams of two light chambers. On the one hand a sharp light/dark boundary can be produced, as is required for example in the light projection of a dipped beam function, and at the same time inhomogeneities (in particular a shady band in the region of the light/dark boundary) in the light projection of a main beam function can be minimised particularly easily, economically and efficiently. In addition, a selective irradiation of light beams into regions of the light projection that are usually of particular significance for the lighting of road signs (what is known as "sign light") is possible. The features according to the invention of the lighting unit additionally enable a particularly favourable and robust structure. The bezel is not movable, but is rigid.

In an advantageous development of the invention the bezel has a reflective surface at least in part. The efficiency of the headlight system can thus be additionally increased in that light reflected at the bezel, which light is otherwise absorbed at the bezel, can be additionally introduced into the projection lens and thus into a light projection produced by the lighting unit or the headlight.

In order to enable a particularly selective influencing by the individual light chambers on the light projection produced by the lighting unit, in accordance with a favourable embodiment of the invention the at least one light path through the at least one light window may run outwardly exclusively from the light chamber located on the underside of the bezel, through the at least one light window through the projection lens. By way of example, in an operating mode in which both light chambers (or the light sources associated with the light chambers) are active (main beam function), a shady band located in the region of the light/dark boundary may thus be avoided in that light beams of the lower light chamber are directed selectively into the region of the light/dark boundary. In an operating mode in which only the upper light chamber is active (dipped beam function), a sharp light/dark boundary is maintained here, whereby legal requirements in respect of the light projection of the lighting unit can be met particularly easily.

In a first particularly simple variant of the invention the bezel has at least one first and one second bezel portion delimiting the at least one light window, wherein the at least one light window is formed as a cutout in the bezel. The bezel portions may be formed in a lamella-like manner here. Generally, the bezel inclusive of the bezel portions may be thin and flat.

In an alternative variant of the invention the bezel has at least one first and one second bezel portion delimiting the at least one light window, wherein the at least one light window consists of a light-permeable dimensionally stable material. The bezel may thus be formed in one piece in a particularly stable manner. The light-permeable material has a prismatic effect on account of the light refraction, wherein the bezel portions and also the light window are preferably formed such that light beams from the lower light chamber can be deflected selectively into the region of the light/dark boundary. An overlap of the light distribution of the lower light chamber with the light distribution attained by the upper light chamber can thus be achieved.

The mixing of the light beams of the two light chambers can be further increased in that the bezel has two light windows, wherein each light window is assigned a light path, wherein the light paths run outwardly through the light windows and through the projection lens. Generally, a plurality of light windows are provided, which are each delimited by bezel portions. The number of the light windows may generally be adapted accordingly to the requirements of the light projection.

In accordance with a favourable development of the invention, the bezel thus has a first, a second and a third bezel portion, wherein the second bezel portion is formed in a lamella-like manner and a first light window is formed for a first light path between the first and the second bezel portion, and a second light window for a second light path is formed between the second and the third bezel portion, wherein the light chambers are arranged on the upper side and underside of the first bezel portion. The first bezel portion preferably has a greater spatial extent than the further bezel portions and is further removed form the focal plane than the second and the third bezel portion. In an advantageous variant of the invention the second bezel portion is designed to deflect the second light path in the direction of the optical axis of the projection lens. The second bezel portion, which is formed in a lamella-like manner, can be rotated about the longitudinal axis thereof for this purpose, such that a selective deflection of the second light path is possible in a simple manner.

The invention also relates to a headlight comprising at least one lighting unit according to one of the preceding claims. Developments of this headlight correspond to those of the lighting unit as discussed here.

Figure 2:
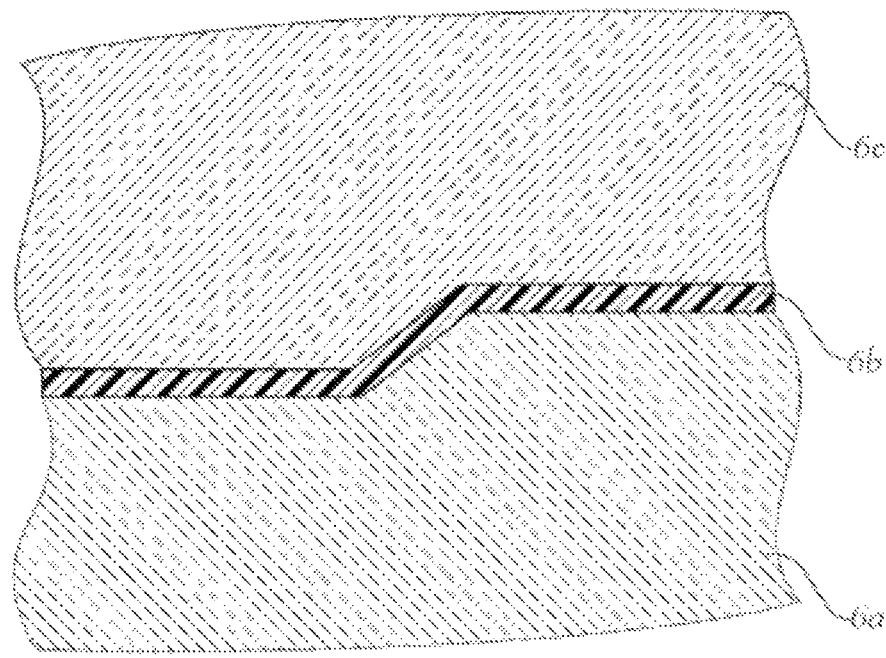
Figure 3:
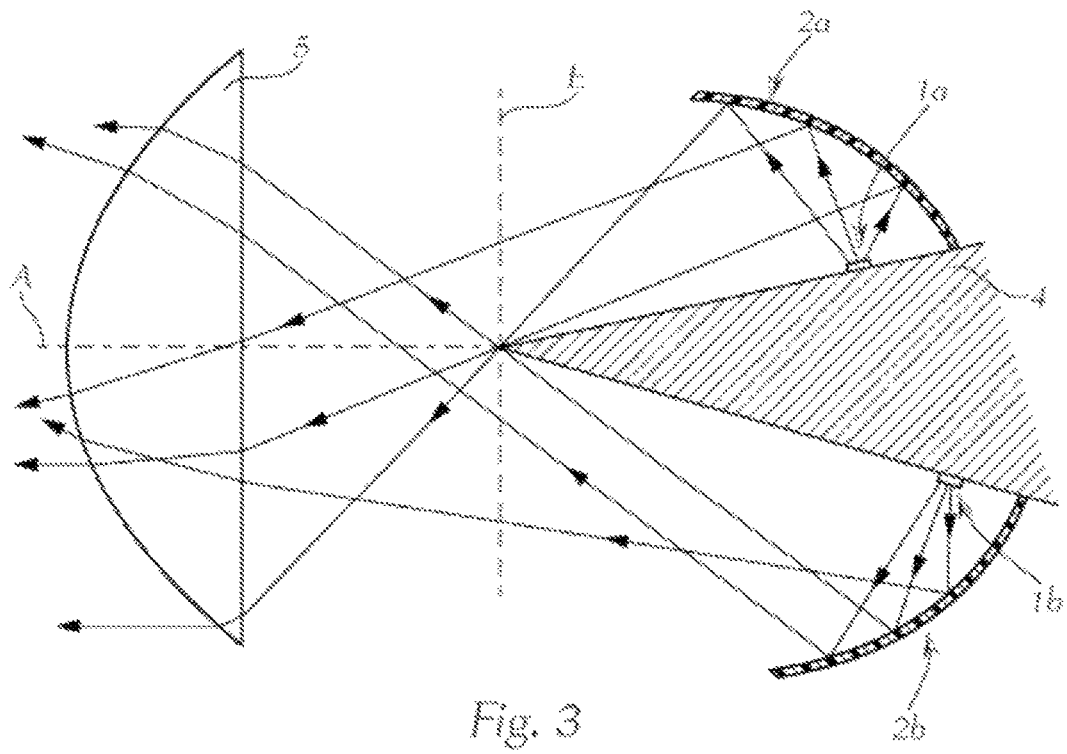
Figure 4:
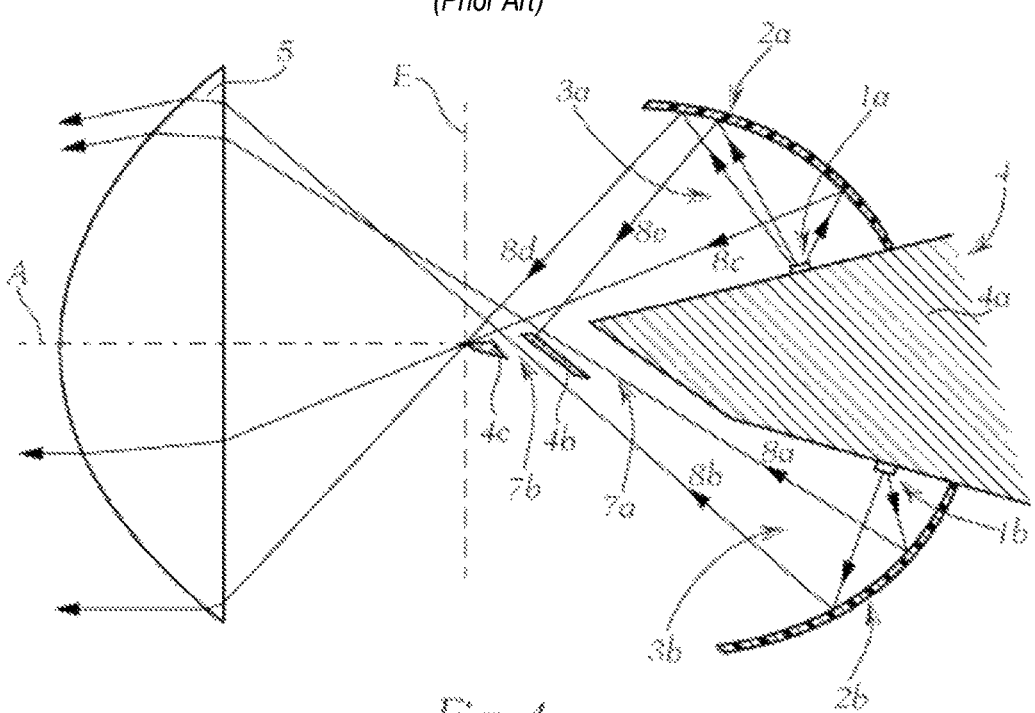
Figure 5:
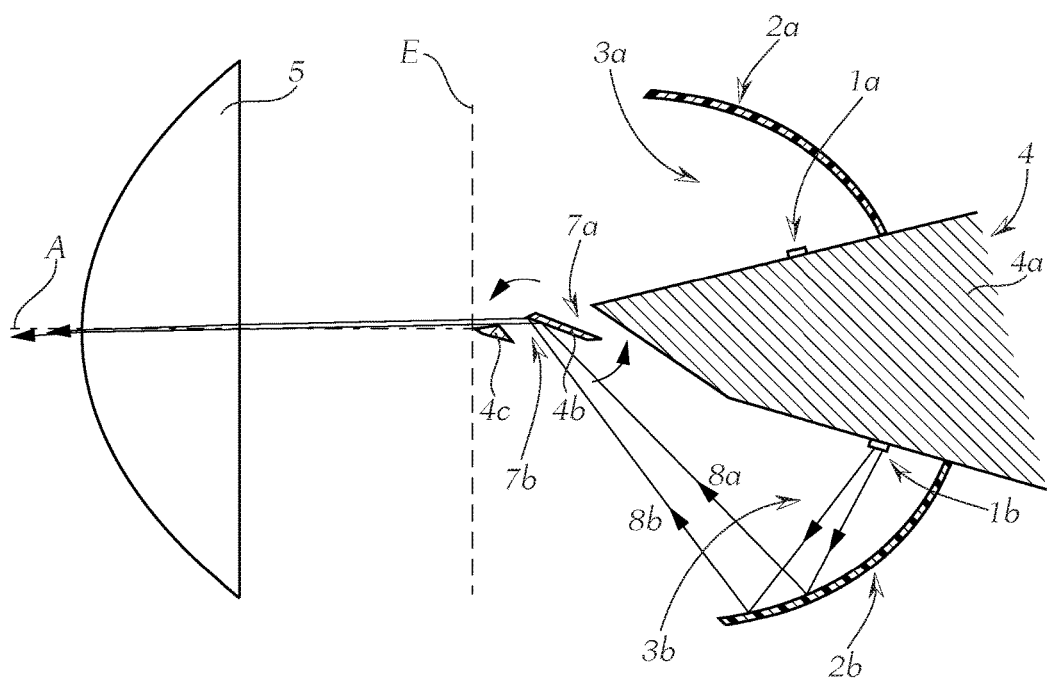

The invention together with further advantages is explained in greater detail hereinafter on the basis of a number of exemplary, non-limiting embodiments, which are illustrated in the figures, in which:

FIG. 1 shows a perspective illustration of a detail of a lighting unit according to the prior art, FIG. 2 shows a detail of the light projections that can be produced with the aid of the lighting unit according to FIG. 1, FIG. 3 shows a schematic sectional illustration of the lighting unit according to FIG. 1, FIG. 4 shows a schematic sectional illustration of a first embodiment of the invention, and FIG. 5 shows a schematic sectional illustration of a second embodiment of the invention.

FIG. 1 illustrates a detail of a lighting unit known from the prior art. Two light sources 1a can be seen therein, which are each surrounded by a reflector 2a. The reflectors 2a reflect light irradiated by the light sources 1a, inter alia in the direction of a downstream bezel 4, which serves to generate a sharp light/dark boundary. An associated projection lens 5 is illustrated in FIG. 3.

FIG. 2 shows a detail of the light projections that can be generated with the aid of the lighting unit according to FIG. 1. Two regions separated by a shaded band 6b, specifically a lower region 6a and an upper region 6c, can be seen therein, wherein the lower region 6a represents the region of the light projection also illuminated in the case of a dipped beam function of the lighting unit. The upper region 6c remains unlit during the period of the dipped beam function, wherein the band 6b runs along a light/dark boundary consisting of two horizontal portions, which are connected by means of an inclined portion. The course of this limit is generally legally prescribed. The upper region 6c is then always illuminated when a main beam function of the lighting unit is in operation. Here, light sources not illustrated in FIG. 1 are activated and are mounted generally below the light sources 1a and irradiate their emitted light at least in part in the direction of the bezel 4 into the upper region 6c. The main beam function is thus characterised here for example by connection of further light sources, which radiate into the upper region 6c. These additional light sources generally cannot be used to radiate light into the lower region 6a, since this is generally prevented by the geometry of the bezel 4. The bezel 4 specifically reaches as far as a focal plane E of the projection lens 5 visible in FIG. 3, whereby a sharp light/ dark boundary should be ensured between the upper and lower region 6a and 6c, more specifically always when the dipped beam function of the lighting unit is in use. By contrast, with operation of the main beam function of the lighting unit, a visible light/dark boundary between the lower and the upper region 6a and 6c is undesirable, since the most uniform illumination possible of the light projection, which is expanded compared with the dipped beam function, is desired. On account of the unavoidable spatial extent (more specifically, the thickness) of the bezel 4 and also on account of shadowing effects, a shady region, specifically the band 6b, always comes to lie in the light projection of the main beam function at the transition between lower and upper region 6a and 6c and is less strongly illuminated and therefore appears in the light projection as dark stripes. With the use of a lighting unit of this type in a motor vehicle headlight, the vehicle driver cannot see the surroundings so well, thus increasing the risk of an accident.

FIG. 3 shows a schematic sectional illustration of the lighting unit according to FIG. 1. The bezel 4 is formed therein in one piece and, as mentioned, reaches as far as the focal plane E of the downstream projection lens 5. Light sources 1a and 1b are mounted on an upper side and an underside of the bezel 4 respectively. The light sources 1a and 1b are each surrounded by a reflector 2a and 2b, which reflectors 2a and 2b are designed to direct light irradiated by the light sources 1a and 1b onto the downstream projection lens 5, wherein the projection lens 5 projects light beams to a region located in front of the lighting unit. Here, the projection lens 5 has an optical axis A, which is oriented substantially normal to the focal plane E. This construction is known from the prior art and has the disadvantages of the prior art already described previously.

FIG. 4 shows a schematic sectional illustration of a first embodiment of the invention. In accordance with the invention a bezel is divided into at least two bezel portions; in the shown exemplary embodiment it consists of a first, a second and a third bezel portion 4a, 4b and 4c, wherein the third bezel portion 4c reaches as far as the focal plane E of a downstream projection lens 5. The bezel 4 generally has a reflective surface. It goes without saying that the bezel 4 is generally impermeable to light. Light sources 1a and 1b are mounted on an upper side and an underside respectively of the first bezel portion 4a, wherein the bezel portion 4a additionally serves as a heat sink for the light sources 1a and 1b. The light sources 1a and 1b are each surrounded by a reflector 2a and 2b, which reflectors 2a and 2b are designed to direct light irradiated by the light sources 1a and 1b onto a downstream projection lens 5, wherein the projection lens 5 projects light beams outwardly to a region located in front of the lighting unit. The light sources 1a or 1b are located here preferably in a focal point of the respective reflector 2a or 2b, wherein the reflector 2a delimits an upper chamber 3a and the second reflector 2b delimits a lower light chamber 3b. The projection lens 5 has an optical axis A, which is oriented substantially normal to the focal plane E. The three bezel portions 4a, 4b and 4c are separated from one another by cutouts forming light windows 7a and 7b, wherein the bezel portions 4a, 4b and 4c together with the cutouts forming a virtual wedge, wherein the side faces of this wedge coincide with aligned side faces of the bezel portions 4a, 4b and 4c. Alternatively to the cutouts, the bezel portions 4a, 4b and 4c could be distanced from one another by a light-permeable dimensionally stable material. The bezel portions 4a, 4b and 4c are substantially parallel to one another, are arranged in succession with respect to the focal plane E, extend preferably normal to the sectional plane according to FIG. 4, and allow the passage of light beams through the light windows 7a and 7b into the projection lens 5 along light paths 8a, 8b sketched by way of example. Here, the passage is provided in the shown embodiment exclusively from the lower light chamber 3b through the light windows 7a and 7b. The bezel portions 4a, 4b and 4c are oriented such that light from the upper chamber 3a cannot pass through the light windows 7a and 7b. This is illustrated by way of example on the basis of a light path 8e, which is delimited by the bezel portion 4b. Light from the lower light chamber 3b, which is connected in the event of a main beam function of the lighting unit, can thus be directed into the region corresponding to the shaded band 6b known from the prior art and described in the introduction. The light/dark boundary or the shaded band 6b in the prior art can thus be illuminated, and a homogeneous light projection can be attained. A dipped beam function, for which exclusively the upper light chamber 3a is activated in the shown embodiment, is not influenced here negatively by the bezel portions 4a, 4b, 4c, since these are formed such that no light beams of the upper light chamber 3a can pass through the light windows 7a or 7b. The light paths 8c and 8d lead along or above the bezel 4 into the projection lens 5.

FIG. 5 shows a second embodiment of the invention, which illustrates a development of the first embodiment. Unless described otherwise, the features here with the same reference signs correspond to those of the first embodiment, and that already mentioned with reference to FIG. 4 also applies here. The second embodiment differs from the first embodiment by the orientation of the second bezel portion 4b. This is no longer arranged in an aligned manner or parallel as before, but has been rotated along the longitudinal axis thereof in an anticlockwise direction. The rotation may be, for example, between 0° and 45°, in particular 5°, 10°, 15° or 20°. In particular, the second bezel portion 4b has a reflective surface, on the basis of which the light paths 8a and 8b can be deflected. Light beams from the lower light chamber 3b thus pass along the light paths 8a and 8b into regions of the light projection of the lighting units which would not have been accessible without the deflection by the second bezel portion 4b. Due to the deflection according to the invention of light paths, inhomogeneities in the light projection of a lighting unit can be compensated for in a selective manner.

The embodiments of the invention shown in FIGS. 4 and 5 show bezels 4 with three bezel portions 4a, 4b and 4c which include two light windows 7a and 7b. Of course, the number of bezel portions and also of light windows may deviate arbitrarily from the number in the shown embodiment. A number of bezel portions may also be formed in a lamella-like manner and/or may be rotated. What is essential is the concept forming the basis of the invention, which can be modified in various ways by a person skilled in the art, yet still can be maintained as such.

The invention claimed is:

1. A lighting unit for a motor vehicle headlight or other headlight, the lighting unit comprising:
   at least two light sources (1a, 1b);
   at least one reflector (2a, 2b), which delimits two light chambers (3a, 3b);
   a bezel (4); and
   a projection lens (5) having an optical axis (A);
   wherein a first light chamber (3a) of the two light chambers (3a, 3b) is arranged on an upper side of the bezel (4) and a second light chamber (3b) of the two light chambers (3a, 3b) is arranged on an underside of the bezel (4), wherein at least one light source (1a, 1b) of the at least two light sources (1a, 1b) is arranged within each of the two light chambers (3a, 3b), wherein the bezel (4) extends substantially as far as a focal plane (E) of the projection lens (5) in order to produce a sharp light/dark boundary in a light exposure produced by the lighting unit, wherein the bezel (4) has at least one light window (7a, 7b), wherein at least one first light path (8a, 8b, 8c, 8d) extends outwardly from one of the two light chambers (3a, 3b), through the at least one light window (7a, 7b), and through the projection lens (5), wherein the bezel (4) has at least two bezel portions (4a, 4b, 4c) delimiting the at least one light window (7a, 7b), wherein at least one bezel portion (4a, 4b, 4c) of the at least two bezel portions (4a, 4b, 4c) is disposed at an angle relative to a longitudinal axis and has a reflective surface configured to deflect at least one second light path (8a, 8b, 8c, 8d) in a direction of the optical axis (A) of the projection lens (5), wherein the at least one light window (7a, 7b) comprises two light windows (7a, 7b), wherein each of the two light windows (7a, 7b) is assigned a light path (8a, 8b, 8c, 8d), which extend outwardly through the two light windows (7a, 7b) and through the projection lens (5), wherein the bezel (4) has a first, a second, and a third bezel portion (4a, 4b, 4c), wherein the second bezel portion (4b) is formed in a lamella-like manner and a first light window (7a) for a first light path (8a) is formed between the first and the second bezel portion (4a, 4b), and a second light window (7b) for a second light path (8b) is formed between the second and the third bezel portion (4b, 4c), wherein the two light chambers (3a, 3b) are arranged on the upper side and underside of the first bezel portion (4a).

2. The lighting unit of claim 1, wherein the bezel (4) has a reflective surface, at least in part.

3. The lighting unit of claim 1, wherein the at least one first light path (8a, 8b, 8c, 8d) through the at least one light window (7a, 7b) runs outwardly exclusively from the second light chamber (3*b*) located on the underside of the bezel (4), through the at least one light window (7*a*, 7*b*), through the projection lens (5).

4. The lighting unit of claim 1, wherein the at least one light window (7*a*, 7*b*) is formed as a cutout in the bezel (4).

5. The lighting unit of claim 1, wherein the at least one light window (7*a*, 7*b*) comprises of a light-permeable dimensionally stable material.

6. The lighting unit of claim 1, wherein the second bezel portion (4*b*) is designed to deflect the second light path (8*b*) in the direction of the optical axis (A) of the projection lens (5).

7. A motor vehicle comprising at least one lighting unit of claim 1.

* * * * *